3 Sheets—Sheet 1.

W. T. CHRISTY.
BRICK-KILN.

No. 192,634. Patented July 3, 1877.

Attest:
Alex. Scott
W. M. Evans

Inventor:
William T. Christy.
By Joseph E. Ware, Attorney.

W. T. CHRISTY.
BRICK-KILN.

No. 192,634.   Patented July 3, 1877.

3 Sheets—Sheet 3.

UNITED STATES PATENT OFFICE.

WILLIAM T. CHRISTY, OF ST. LOUIS, MISSOURI.

IMPROVEMENT IN BRICK-KILNS.

Specification forming part of Letters Patent No. 192,634, dated July 3, 1877; application filed January 27, 1877.

*To all whom it may concern:*

Be it known that I, WILLIAM T. CHRISTY, of St. Louis, in the county of St. Louis and State of Missouri, have invented a new and useful Improvement in Brick or Formed Clay Kilns, which I term "the universal iron case portable combined drafts and blast-kiln for burning clay forms," which improvement is fully set forth in the following specification, reference being had to the accompanying drawings.

The object of my invention is to effect, in the construction of brick-kilns, certain improvements whereby the advantages of updraft, downdraft, natural draft, and pressure-blast can be interchangeably used to a very rapid, uniform, and perfect burning of bricks, pipes, tiles, pottery, retorts, shells, or other forms of clay-work, with avoidance of the loss that arises, mainly in brick-burning, from the production of an undue proportion of soft brick and the bad utilization of the fuel used, with a lack of means of control over its effective and positive action.

I also, in combination with an iron exterior shell for kilns, have devised a sectional, and consequently a portable, form for said iron exterior shell, by which, if clay stock in a locality becomes exhausted, or for other reasons, it can be quickly taken apart, and quickly re-erected after change to a new location.

There are also provided better means for heating the air, before injection into the firing-places, by the interior circular bustle-pipe, having few or many radial branchings, terminating in blowing-nozzles.

The action of my improved kiln has been confined to a single one; but I prefer its use in blocks of two or more, wherein the following successive routine may be maintained by the interlinking of, say, four kilns by pipe-connections, through which the escaping heat from a fired kiln can be absorbed to a useful end in drying a green kiln. The following valuable result then follows its proper application: The kiln that is burning affords escaping heat sufficient to fully dry a kiln of green-clay work. Hence there may be one kiln being set, one being drawn, one being burned, and one drying out ready to fire.

Fifteen to twenty hours afford time sufficient, after perfect drying, to have the fullest heat drawn on and the entire contents of the kiln well burned.

Figure 1:
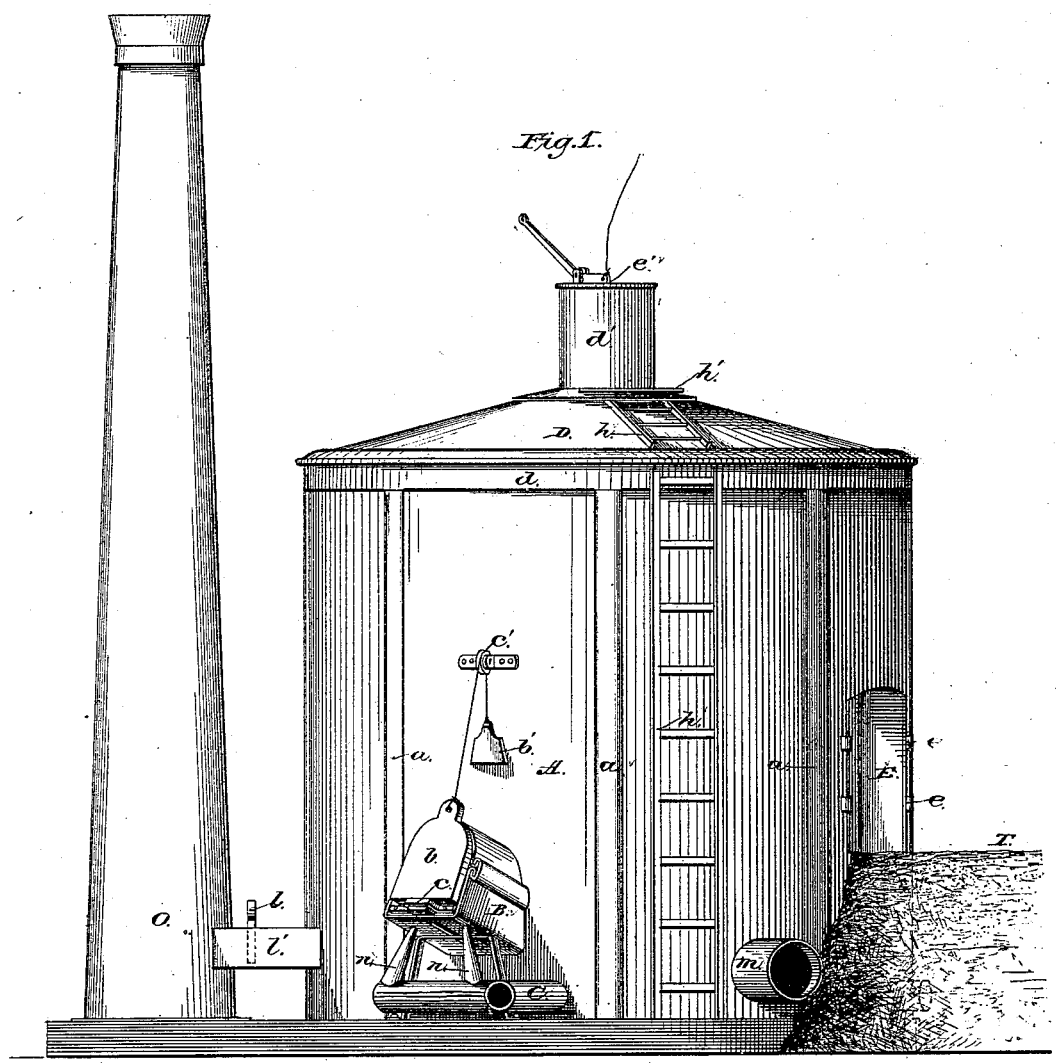
Figure 2:
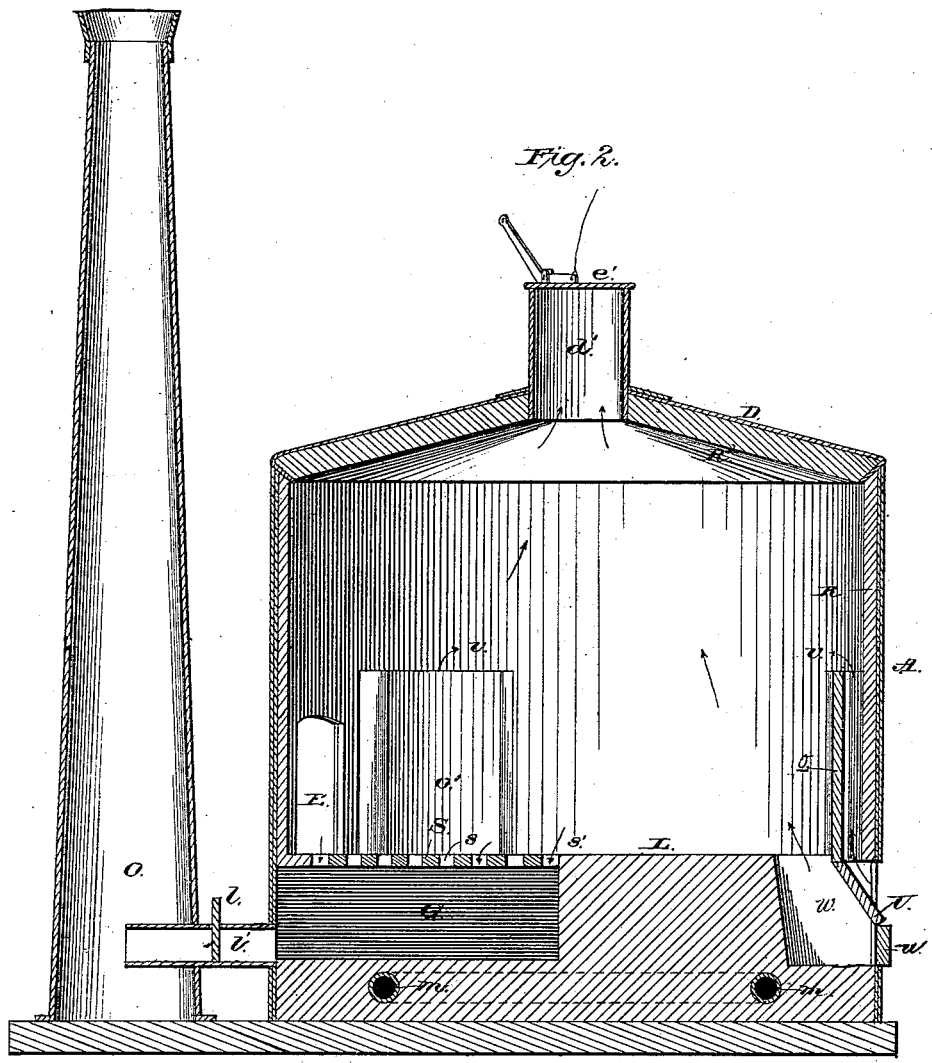
Figure 3:
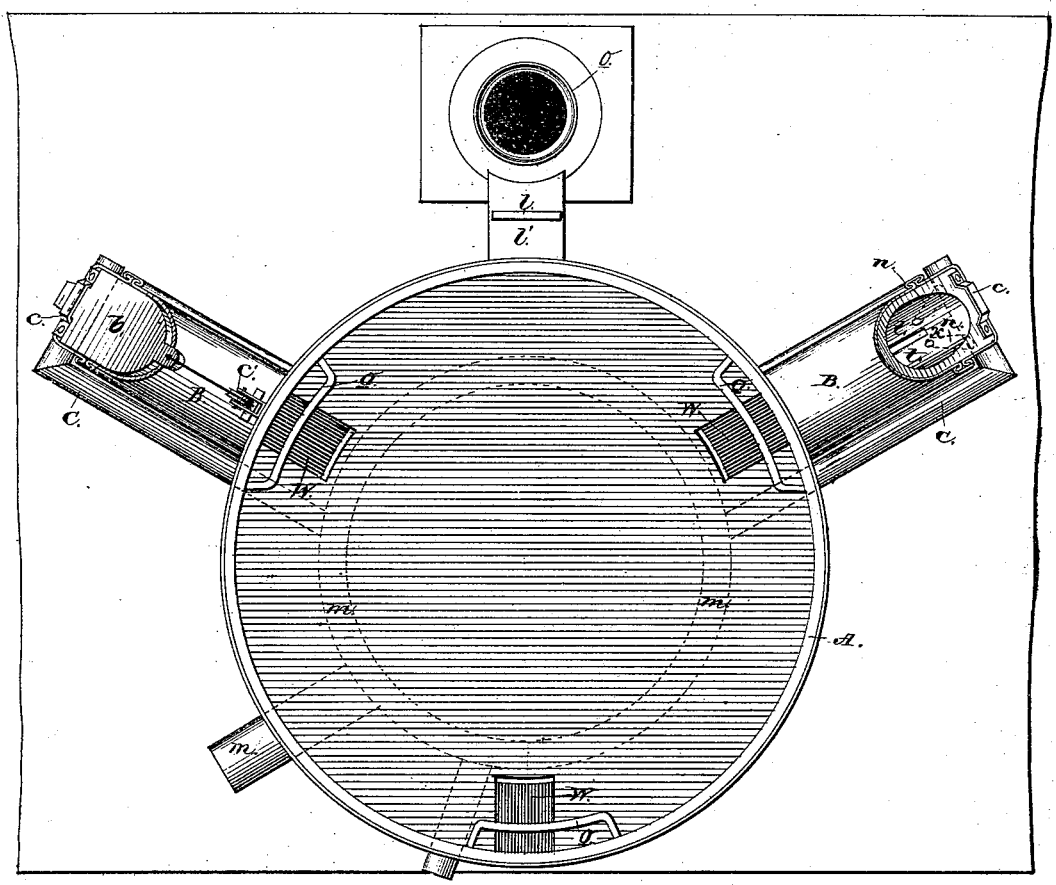
Figure 4:

My kiln is illustrated in the perspective view, Figure 1, and in greater detail in the elevation, Fig. 2, the plan view, Fig. 3, and in the section, Fig. 4, Sheets 1, 2, and 3.

I do not deem it necessary to show the blast-generator, nor the means used, when several kilns are worked consecutively, for the intermediate utilization of the heat of a fired kiln for the purpose of drying green work in set kilns prior to the final escape of the gas and air currents into the chimney-stack.

Fig. 2 shows the foundation of a kiln, which may be either round or square. The masonry-work of the foundation should be substantial, built within the iron exterior shell in its upper parts, and having the floor elevated above the yard-surface. Channels are formed in the foundation for the reception of the supply and bustle pipes and the branchings therefrom, also for the firing and downdraft pits. The exterior iron shell serves to strongly bind the foundation through its extension downward below the pits and channel-bottoms. The iron shell is made in portable sections as to size and weight. Its parts are to be held together, when erected, by locking-joints, the joint shown, Fig. 4, being preferred, it being incollapsible. The shell may be single and lined with fire-brick, or doubled, having between the shells a water-space, which arrangement is the best as an incasement, and also the most durable and economical.

A, Figs. 1, 2, and 3, shows the iron shell. $A^2$, Fig. 4, illustrates the double incasement-shell in sectional and portable parts, in the lower part of which necessary mud-valves may be placed. *a*, same figure, shows the locking-joints.

B B, Fig. 1, show the firing-places, of which there may be any desirable number; *b b*, balanced doors to firing-places; *b'*, balance-weight to fire-doors; C, branches to bustle-pipe; *c*, straps to retain heel of balance-doors from blowing out by the blast-pressure; *c'*, pulley for chain for balance-weight; D, kiln-arch, which is capable of being supported by trusses and suspension-rods therefrom when the span of the arch is long; $d$, skewback-band of great strength, to prevent the spreading of an ordinary arch-span; $d'$, updraft-chimney, which is open only when the kiln is worked updraft; E E, wicket-doors for filling or emptying the kiln through, they being large enough for the passage of wagons entirely through the kiln; $e\ e$, eyes for retaining the wicket-bars when the kiln is filled and in heat; $e'$, register by which the heat and flames are made to pass down into the downdraft-pit G, Fig. 2. This downdraft-pit is covered by fire-proof grating S, through which the once-used currents are drawn by the chimney O. $h\ h$, ladders by which to reach the chimney $b$; $h'$, platform for helper to stand on while luting down the register $e'$, which is to be made of fire-proof matter; L, kiln-floor; $l$, valve for cutting off the downdraft when the tile-valve $u$, Fig. 2, is withdrawn; $l'$, flue between chimney O and the kiln. It is from this flue that the heated escaping current of gases and air can be led off into intermediate utility in drying out the work that may be elsewhere in preparation for burning. $m\ m$, Fig. 3, bustle-pipe contained in a channel in the foundation of the kiln. The heated foundation, when the kiln is in heat, serves to heat the blast-air before its use. $n\ n$, Figs. 1 and 3, blast-nozzles for blowing into the firing-places during updraft, and passing through holes in the bottom of the firing-places; $O'$, downdraft-chimney; $o\ o$, flash-walls to conduct the flames and heat up the sides of the kiln and toward its dead angles. Returning, the current passes downward into the pit G. R, fire-brick lining or water-space; $R^2$, lining of arch; $r\ r$, Fig. 4, sections showing the shell as a water-case; $r'$, stay-bolts to water-case; S, down-grating; $s\ s$, draft-passages through the grating S, which lead all the unused downdraft heat and gases into the pit G; T, wagon-roadway level with floor of kiln-bottom; $t\ t$, Fig. 3, entrance of blast-nozzles into the firing-places; U, splitting-bridge for dividing the drafts in connection with the opening of the valve $l'$; $u$, valve-tile, which, when pushed in, changes the flame and heat to the flash-wall passages; $v\ v$, the current-line when valve-tile $u$ is pushed in; $w\ w\ w$, pits in the rear of the firing-places; $x$, Fig. 3, slot in each firing-place bottom, through which to draw the clinkers formed.

The operation of my kiln is as follows: The setting of the kiln is similar to that of any ordinary kiln, with only the necessity for arching over all the pits and downdraft-grating. When the setting is completed the wicket-doors must be built up and the wicket-braces inserted in the eyes therefor. Fire-clay lumps or bats may be used for filling up the wickets or man-holes when they are used. The green work in the kiln is next slowly dried. After full drying the charge must be slowly and moderately heated, the downdraft heat being the safest heat. When all the water of combination is expelled from the clay the fires should be gradually increased in power. After the heat is raised to a dull red it is of importance that it should be extended uniformly to the center and angles of the kiln. To secure a diffusive heat, the changing-valve $l$ should be let down in the flue $l'$, the register then to be raised and the blast used with light pressure until the entire charge assumes a uniform bright cherry-red heat. If the peep-holes that are always provided show uniformity in the prevalence of the heat, the fires and blast may be increased for a finishing-off heat. From this point, if the firing is good and the blast well regulated, twelve hours will suffice to finish the burning in a manner inapproachable under dependence upon natural draft and open burning.

To cool off the kiln, and to secure strength to the brick or other goods by annealment, all passages capable of admitting air should be closed and luted well, the register and change-valve in particular. After a closure of twelve hours these latter valves may be opened, and by the well-known tendency of heated currents the taller chimney will exhaust the heat from the kiln, while the cool external air will descend the chimney $d'$. The heat abstracted from the hot kiln I propose to conduct into other kilns by means therefor, to do intermediate service in drying, preparatory to firing these kilns.

The operations of filling and emptying the kilns can be greatly facilitated by having a number of man-holes at different levels.

What I claim as my invention, and desire a patent therefor, is—

1. The sectional incasement A and the binding-clamps $a\ a$, combined with the arch skewback-band $d$, as and for the purposes herein described.

2. The sliding valve $u$, in combination with grating S and valve $l$, as and for the purposes herein described.

3. The closed firing-places with balanced doors $b$, combined with the split-bridge U, the cut-off valve-tile $u$, and the clinkering-slot $x$, as and for the purposes herein described.

WILLIAM T. CHRISTY.

Witnesses:
B. A. BERRYMAN,
JOSEPH E. WARE.